United States Patent
Baatz

(10) Patent No.: US 9,085,366 B2
(45) Date of Patent: Jul. 21, 2015

(54) DEVICE FOR LYING OR SITTING ON

(71) Applicant: AIRBUS OPERATIONS GMBH, Hamburg (DE)

(72) Inventor: Andreas Baatz, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 5 days.

(21) Appl. No.: 13/923,856

(22) Filed: Jun. 21, 2013

(65) Prior Publication Data

US 2013/0291307 A1 Nov. 7, 2013

Related U.S. Application Data

(63) Continuation of application No. PCT/EP2011/006528, filed on Dec. 22, 2011.

(60) Provisional application No. 61/426,586, filed on Dec. 23, 2010.

(30) Foreign Application Priority Data

Dec. 23, 2010 (DE) .......................... 10 2010 055 994

(51) Int. Cl.
*B68G 5/00* (2006.01)
*B64D 11/06* (2006.01)

(52) U.S. Cl.
CPC .............. *B64D 11/06* (2013.01); *B64D 11/064* (2014.12); *B64D 11/0649* (2014.12)

(58) Field of Classification Search
CPC ......... A61G 1/013; A61G 1/01; A61G 1/044; A61G 1/00; A61G 2220/10; A47C 17/80; A47C 19/126; A47C 17/72; A47C 17/64; A47C 19/14; A47C 17/84; A47C 19/04
USPC ............. 5/652, 110–116, 118, 119, 627, 211, 5/213, 214

See application file for complete search history.

(56) References Cited

U.S. PATENT DOCUMENTS

| | | | | |
|---|---|---|---|---|
| 202,053 A * | 4/1878 | Rubel | ............................... | 5/213 |
| 808,122 A * | 12/1905 | Tanck | ........................... | 198/816 |
| 844,263 A * | 2/1907 | Dietrich | ........................ | 254/231 |
| 859,470 A * | 7/1907 | Van Orman | ...................... | 5/232 |
| 868,048 A * | 10/1907 | Whitlock | .......................... | 5/116 |
| 1,060,492 A * | 4/1913 | Pietrzak | ............................ | 5/211 |
| 1,131,147 A * | 3/1915 | Mackin | ............................ | 5/233 |

(Continued)

FOREIGN PATENT DOCUMENTS

| | | |
|---|---|---|
| DE | 101 12 204 | 9/2002 |
| EP | 1 207 074 | 5/2002 |

(Continued)

OTHER PUBLICATIONS

International Search Report dated May 7, 2012.

*Primary Examiner* — Timothy D Collins
*Assistant Examiner* — Richard G Davis
(74) *Attorney, Agent, or Firm* — Dickinson Wright PLLC

(57) ABSTRACT

A device for lying or sitting on includes a frame and also a covering which is stretched over the frame and defines a surface for lying or sitting on of the device for lying or sitting on. A tensioning device is adapted to interact with the frame and/or the covering in order to vary the pre-tensioning force which acts upon the covering.

11 Claims, 4 Drawing Sheets

(56) References Cited

U.S. PATENT DOCUMENTS

| | | | | |
|---|---|---|---|---|
| 1,139,573 | A | * | 5/1915 | Peterson ................ 5/216 |
| 1,360,983 | A | * | 11/1920 | Burton et al. ............ 5/154 |
| 1,691,268 | A | * | 11/1928 | Conrad .................. 5/119 |
| 2,874,390 | A | * | 2/1959 | Stone ................... 5/716 |
| 3,490,084 | A | * | 1/1970 | Schuster ................ 5/652 |
| 3,711,156 | A | | 1/1973 | Bloomfield |
| 3,893,198 | A | * | 7/1975 | Blair ................... 5/699 |
| 3,898,704 | A | * | 8/1975 | Gallaher et al. ......... 5/2.1 |
| 3,981,538 | A | | 9/1976 | Chubb |
| 4,094,025 | A | * | 6/1978 | Nystad .................. 5/665 |
| 4,807,314 | A | | 2/1989 | Fry |
| 5,063,625 | A | * | 11/1991 | Perry ................... 5/697 |
| 5,342,111 | A | | 8/1994 | Charles |
| 6,604,792 | B1 | | 8/2003 | Picard |
| 6,868,565 | B2 | * | 3/2005 | Frey .................... 5/190 |
| 2002/0060484 | A1 | | 5/2002 | Schmidt-Schaeffer |
| 2003/0057323 | A1 | * | 3/2003 | Keogh ................. 244/118.5 |
| 2003/0172458 | A1 | * | 9/2003 | Bonfanti et al. ......... 5/490 |
| 2009/0206201 | A1 | * | 8/2009 | Johnson et al. ....... 244/118.6 |

FOREIGN PATENT DOCUMENTS

| | | |
|---|---|---|
| FR | 2 587 201 | 3/1987 |
| WO | 2004/016462 | 2/2004 |

* cited by examiner

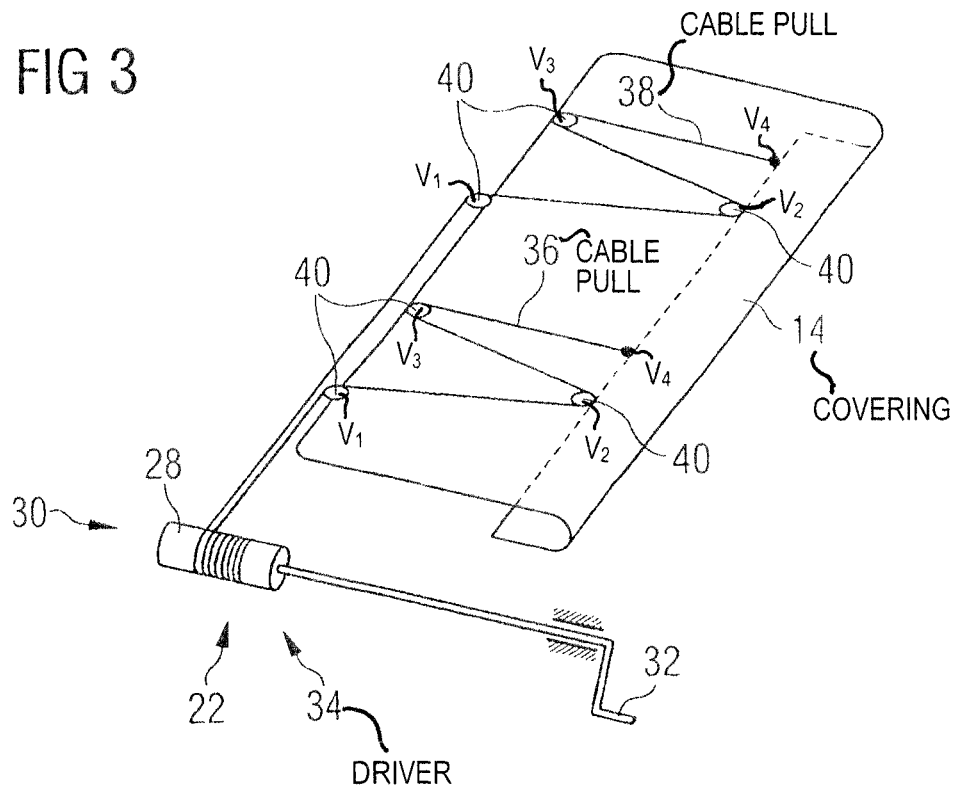
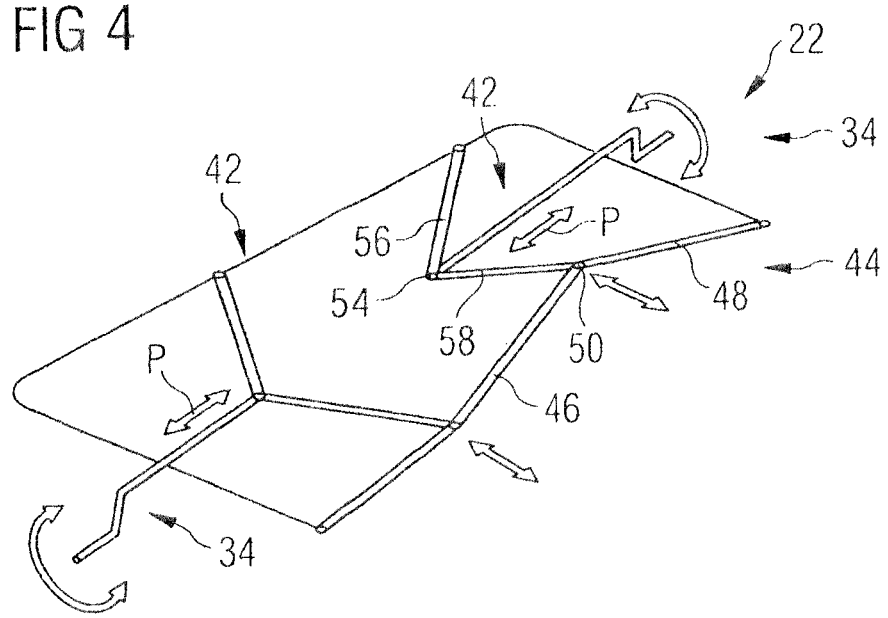

DEVICE FOR LYING OR SITTING ON

CROSS REFERENCE TO RELATED APPLICATIONS

This application is a bypass continuation of PCT/EP2011/006528 filed Dec. 22, 2011 which is entitled to and claims the benefit of German Application No. DE 10 2010 055 994.6 filed Dec. 23, 2010, and U.S. Provisional Application No. 61/426,586, filed Dec. 23, 2010, the disclosures of each of which, including the specification, claims, drawings and abstract, are incorporated herein by reference in their entirety.

FIELD

The present invention relates to a device for lying or sitting on which is suitable for use in a vehicle, in particular an aircraft.

BACKGROUND

Modern long-haul passenger aircraft are usually equipped with rest rooms for the crew, to which the crew-members can retire during the flight. In these rest rooms for the crew, beds are provided in which a surface for lying on is formed by a mattress made of latex or foam which is supported on a corresponding, suitable under-frame. Beds of this kind are relatively heavy. Furthermore, because of the fact that the mattresses have to be used by many different people, it is not possible to adapt the characteristics of use, and particularly the firmness of the mattresses, to the perceptions of individual users as regards comfort.

From EP 1 207 074 B1, a passenger seat which is suitable for use in an aircraft and which has a backrest that can be adjusted between a sitting position and a lying position, is known. A seating surface springing system of the passenger seat comprises rotatably mounted seat lamellae. By rotating the seat lamellae, it is possible to vary the stiffness per unit area of the seating surface in dependence upon the position of the backrest.

SUMMARY

The underlying object of the invention is to provide a device for lying or sitting on which is distinguished by low weight and a high degree of comfort.

This object is achieved by means of a device for lying or sitting on having features of attached claims.

The device for lying or sitting on according to the invention comprises a frame and also a covering which is stretched over said frame and defines a surface for lying or sitting on of the device for lying or sitting on. The frame may consist of plastic, metal or other suitable material. For example, the frame may be formed by tubes of solid or hollow cylindrical construction. Basically, the frame may consist of frame sections which are connected to one another in an integrated manner. As an alternative to this, however, the frame may also have frame sections which are not connected directly to one another but which, for example, lie opposite one another. All that is essential is that the frame is capable of functioning as a carrier for the covering which is to be stretched over it. The device for lying or sitting on according to the invention may be a piece of furniture for sitting on, for example an armchair, a passenger seat or a sofa, but may also be a piece of furniture for lying on, for example a bed. When the covering is stretched over the frame, said covering is acted upon by a defined pre-tensioning force which imparts to it a rigidity which is necessary in order allow the covering to be used as a surface for lying or sitting on.

The device for lying or sitting on according to the invention further comprises a tensioning device which is adapted to vary the pre-tensioning force which acts upon the covering. For this purpose, the tensioning device interacts with the frame and/or the covering. The tensioning device may be adapted to vary the pre-tensioning force acting upon the covering in stages or continuously. By varying the pre-tensioning force acting upon the covering, it is possible to influence, in a selective manner, the firmness of the surface for lying or sitting on defined by the covering. The device for lying or sitting on according to the invention thus has a surface for lying or sitting on, the firmness of which can be set individually.

The device for lying or sitting on according to the invention having a surface for lying or sitting on which is defined by a covering stretched over a frame is distinguished by a particularly low weight. In addition, the device for lying or sitting on offers a high degree of comfort, since each user is able to set the firmness of the surface for lying or sitting on individually according to his requirements.

The tensioning device is preferably adapted to apply a variable tensile force to the covering for the purpose of varying the pre-tensioning force which acts upon said covering that is stretched over the frame. The more tensioning force the tensioning device applies to the covering, the firmer the surface for lying or sitting on defined by the covering becomes. In addition or as an alternative to this, the firmness of the surface for lying or sitting on defined by the covering can be varied by varying the dimensions of the frame. The larger the dimensions of the frame set by the pre-tensioning apparatus, the greater the pre-tensioning acting upon the covering and the firmer the surface for lying or sitting on which is defined by said covering. Basically, the tensioning device may be adapted to apply, to the covering, a pre-tensioning force which is constant over the entire surface for lying or sitting on which is defined by said covering. Said surface for lying or sitting on then has an approximately constant firmness over its entire area. As an alternative to this, however, the tensioning device may also be adapted to vary, locally, the pre-tensioning force which acts upon the covering stretched over the frame. Such a configuration of the tensioning device permits, in advantageous manner, local variation of the firmness over the area of the surface for lying or sitting on. The device for lying or sitting on according to the invention can thereby be adjusted still more satisfactorily to the particular requirements of individual users; for example, it is possible to carry out local variation of the firmness of the surface for lying or sitting on for the purpose of adjusting it to a preferred sleeping or sitting position or to the weight of a user.

The tensioning device may, for example, be adapted to apply a variable tensile force to the covering in a locally limited manner in order to vary, locally, the pre-tensioning force which acts upon the covering stretched over the frame. Local limitation of the tensile force applied to the covering may be achieved, for example, through the fact that said tensile force acts on a defined point or defined region of the covering, while other regions of said covering, on the other hand, are influenced less or not at all by said tensile force. As an alternative or in addition to this, the tensioning device may be adapted to vary the dimensions of the frame in a locally limited manner. For example, a space between two mutually opposite frame sections may be varied in a locally limited manner in order to vary the pre-tensioning force acting upon the covering in a locally limited manner.

In one form of embodiment of the device for lying or sitting on according to the invention, the tensioning device comprises a frame section which is connected to the covering and is rotatable about an axis of rotation. The rotatable frame section may, for example, be formed by a solid or hollow cylindrical tube which is mounted so as to be rotatable relative to other sections of the frame. The tensioning device may further comprise a driving apparatus which is adapted to rotate the rotatable frame section about the axis of rotation for the purpose of varying the pre-tensioning force which acts upon the covering stretched over the frame. Rotation of the rotatable frame section about the axis of rotation in a first direction of rotation then results in the covering being "wound up" onto the frame section and, in the process, being subjected to increased pre-tensioning. On the other hand, rotation of the rotatable frame section about the axis of rotation in a second direction, which is opposed to the first direction of rotation, results in the covering being "unwound" from the rotatable frame section, and in the pre-tensioning acting upon the covering being thereby reduced.

The driving apparatus may, for example, comprise a worm gear with a worm wheel which can be rotated automatically, for example by means of an electric motor or the like, or manually, for example by means of a crank handle. The rotary movement of the worm wheel may, for example, be transmitted to the rotatable frame section via a gear wheel, it being possible to arrange said gear wheel, for example, in the region of an end face of the rotatable frame section. Instead of a worm gear, it is also possible, of course, to use a different gear unit. It is advantageous, however, to use a self-locking gear unit which makes it possible to dispense with an additional safety apparatus for securing the rotatable frame section in a desired position.

The tensioning device may further comprise a cable pull which is connected to the covering at at least one connection point. If desired, the cable pull may also be connected to the covering at a number of connection points. In order to avoid friction, the cable pull may be equipped with deflecting rollers at points of deflection. The tensioning device preferably further comprises a driving apparatus which is adapted to apply a tensile force to the cable pull for the purpose of varying the pre-tensioning force which acts upon the covering stretched over the frame. Said driving apparatus may, once again, be equipped with an automatically or manually actuatable, preferably self-locking gear unit. Basically, it is possible to equip the tensioning device with just one cable pull and one driving apparatus. If desired, however, it is also possible to provide a number of cable pulls, which may be coupled to one or more driving apparatuses.

In a further form of embodiment, the tensioning device may comprise a knee lever mechanism formed by suitable sections of the frame. For this purpose, a frame section which extends along one edge of the surface for lying or sitting on which is defined by the covering may be provided with a first joint. This joint may be acted upon by a knee lever provided with a second joint. A driving apparatus of the tensioning device is preferably adapted to apply an actuating force to the knee lever mechanism for the purpose of varying the pre-tensioning force which acts upon the covering stretched over the frame. Said driving apparatus may, for example, act upon the second joint of the knee lever. Actuation of the knee lever mechanism results in displacement of the first joint of the frame section and, with it, variation of the dimensions of the frame. This results in variation of the pre-tensioning force acting upon the covering. If desired, the device for lying or sitting on may comprise a number of knee lever mechanisms and/or a number of driving apparatuses. Such a configuration of the device for lying or sitting on then permits local variation of the pre-tensioning force acting upon the covering. Should the dimensions of the surface for lying on be necessarily defined as invariable, the knee lever mechanism may also be located in a concealed manner underneath the covering, and the pre-tensioning force may be caused to act upon said covering via a frame segment constructed as a deflecting roller.

As already mentioned, the tensioning device of the device for lying or sitting on according to the invention may comprise just one driving apparatus. For that purpose, a tensioning device equipped with a driving apparatus is capable of subjecting the covering to locally varying pre-tensioning, through the fact that the force provided by the driving apparatus is applied, in a locally isolated manner, to individual regions of the covering. However, the pre-tensioning force applied by a driving apparatus to the covering at various, locally isolated points is always the same in each case. Still more selective setting of the pre-tensioning force acting upon the covering is therefore possible if the tensioning device comprises a plurality of driving apparatuses. Said driving apparatuses are then able to apply different pre-tensioning forces to the covering extensively over the entire surface for lying or sitting on, or in a locally isolated manner.

In one embodiment of the device for lying or sitting on the tensioning device may comprise a frame section having a variable length and a driving apparatus which is adapted to lengthen the frame section having a variable length so as to apply a variable tension force to the covering. The driving apparatus may comprise a hydraulic or pneumatic cylinder which may be incorporated into the frame section having a variable length. As an alternative thereto, the frame section having a variable length may be provided with suitable threads allowing to lengthen the frame section by rotating one portion of the frame section relative to another portion of the frame section. The driving apparatus then for example may comprise an electric motor coupled to the rotatable portion of the frame section.

Particularly when the device for lying or sitting on according to the invention is to be used in a vehicle, for example an aircraft, it is advantageous if said device for lying or sitting on can be stowed in the smallest possible space when it is not in use. In one preferred form of embodiment of the device for lying or sitting on, therefore, two mutually opposite sections of the frame of said device are designed to be capable of telescoping. A device for lying or sitting on which is configured in this way has a small volume for stowage purposes. Although the configuration of a device for lying or sitting on having frame sections that are designed to be capable of telescoping will be described in here in connection with a device for lying or sitting on which comprises a tensioning device which is adapted to apply a varying pre-tensioning force to the covering of said device that is stretched over the frame, the device for lying or sitting on can also be configured, independently of such a tensioning device, with frame sections that are designed to be capable of telescoping. A device for lying or sitting on according to the invention may therefore also comprise just a frame, a covering which is stretched over said frame and defines a surface for lying or sitting on of said device, and two mutually opposite frame sections that are designed to be capable of telescoping.

In one preferred form of embodiment of the device for lying or sitting on according to the invention, the covering comprises a knitted or woven fabric. A knitted or woven fabric is distinguished by low weight, a high degree of robustness and also the capacity to be exposed to a variable pre-tensioning force for the purpose of setting the firmness of the device for lying or sitting on defined by the covering. The pre-tensioning applied to said covering may be directed in the direction of the weft thread or of the warp thread. Furthermore, a knitted or woven fabric can be pre-tensioned both in the direction of the weft thread and in the direction of the warp thread. Basically, the knitted or woven fabric used for the covering of the device for lying or sitting on according to the invention may consist of fibres made of any desired suitable material. However, synthetic fibres are distinguished by a high degree of elasticity.

Furthermore, the covering of the device for lying or sitting on according to the invention may comprise a film made of a thermally insulating, vapour-permeable and liquid-tight material or may consist of a film of this kind. A film of this kind prevents moisture from penetrating through the covering and seeping onto the floor or onto another device for lying or sitting on which is arranged underneath said device. The film may consist, for example, of a Goretex® or comparable material.

The film is preferably applied to an upper side of the covering, which upper side is to be used as the surface for lying or sitting on. If desired or if necessary, however, the film may also be applied on a lower side of the covering that lies opposite the upper side of the covering, or on both the upper side and the underside of said covering.

A system according to the invention for lying or sitting on comprises a device for lying or sitting on that has been described above, and also a storage apparatus for storing said device when it is not being used. The storage apparatus may, for example, comprise a receiving compartment which is integrated into a pillar arranged in a cabin. Said receiving compartment may be closable by means of a flap.

Like the system according to the invention for lying or sitting on, the device for lying or sitting on according to the invention is usable in a particularly advantageous manner in an aircraft, but also in other means of transport. For example, the device or system may be employed in a rest room for crew.

BRIEF DESCRIPTION OF DRAWINGS

Preferred exemplified embodiments of the invention will now be explained in greater detail with the aid of the appended diagrammatic drawings, in which:

FIG. 3 shows a second embodiment of a tensioning device for applying a variable pre-tensioning force to a device for lying on;

FIG. 4 shows a third embodiment of a tensioning device for applying a variable pre-tensioning force to a covering of a device for lying on;

DETAILED DESCRIPTION

Figure 1:
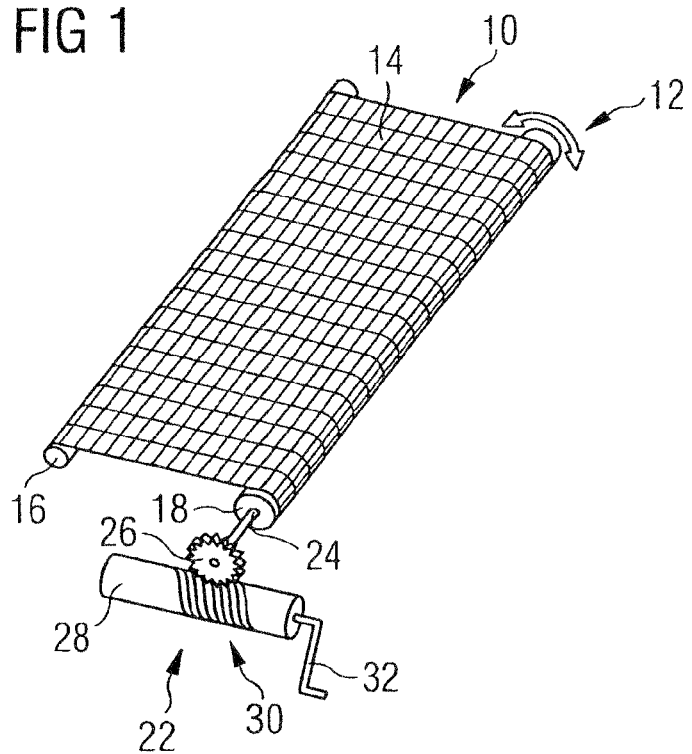
FIG. 1 shows a device for lying on, having a covering stretched over a frame, and also a first embodiment of a tensioning device for applying a variable pre-tensioning force to said covering.

A device 10 for lying on which is shown in FIG. 1 comprises a frame 12 and also a covering 14 which is stretched over said frame 12 and defines a surface for lying on of the device 10 for lying on. The frame 12 comprises two frame sections 16, 18 which extend along the long sides of the covering 14, which has a rectangular shape.

Figure 2:
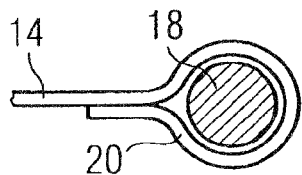
FIG. 2 shows a representation of a detail of the device for lying on as illustrated in FIG. 1.
Figure 2A:
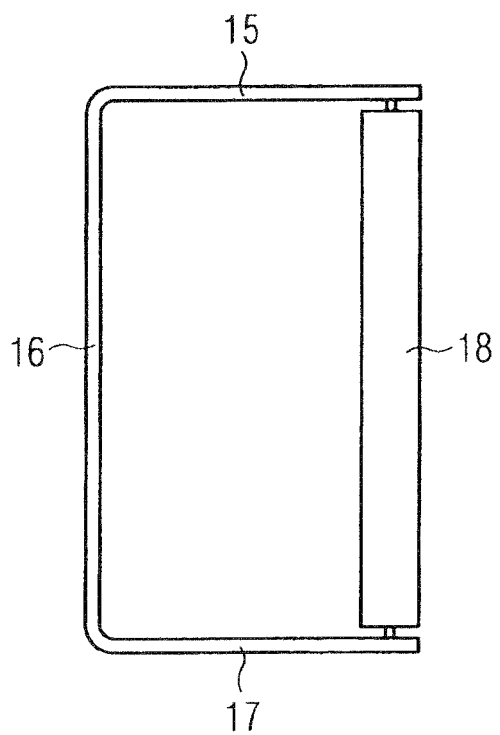
FIG. 2a shows a further representation of the first embodiment of a tensioning device illustrated in FIG. 1.

As can best be seen in FIG. 2a, a piece of piping 20 (see FIG. 2) is constructed along the edges of the covering 14 and encloses the frame sections 15, 16, 17 of the frame 12. Said frame sections 16, 16, 17 are each formed by hollow cylindrical tubes. In the exemplified embodiment of a device 10 for lying on which is shown, the frame 12 has three frame sections 15, 16, 17. If desired, however, the frame 12 may also be of integrated construction, that is to say, may comprise sections which extend along the entire periphery of the covering 14.

The device 10 for lying on further comprises a tensioning device 22 which serves to apply a variable pre-tensioning force to the covering 14. The firmness of the surface for lying on of the device 10 for lying on, which surface is defined by the covering 14, is determined by the pre-tensioning force applied to said covering 14.

In the exemplified embodiment shown in FIG. 1, the tensioning device 22 comprises the frame section 18 which is designed so as to be rotatable about an axis of rotation 24. In the region of an end face, the frame section 18, which is rotatable about the axis of rotation 24, is connected to a gear wheel 26. The teeth of said gear wheel 26 are in engagement with a worm wheel 28, so that the gear wheel 26 and the worm wheel 28 form a worm gear 30. In the exemplified embodiment shown, the worm gear 30 can be actuated by means of a crank handle 32. Of course, however, the device 10 for lying on may also comprise a device for actuating the worm gear 30 automatically, for example an electric motor or the like.

By rotating the worm wheel 28 by means of the crank handle 32 it is possible to bring about a rotation of the gear wheel 26 and consequently a rotation, about the axis of rotation 24, of the frame section 18 which is fixedly connected to said gear wheel 26. Assuming the frame sections 15, 16, 17 are rigidly mounted, it is thus possible, by actuating the worm gear 30, to apply a pre-tensioning force to the covering 14 of the device 10 for lying on. The pre-tensioning force acting upon the covering 14 is the greater, the further the frame section 18 is rotated clockwise about the axis of rotation 24. Similarly, it is possible, by rotating the frame section 18 anticlockwise about the axis of rotation 24, to achieve a reduction in the pre-tensioning force acting upon the covering 14. The worm gear 30 thus forms, together with the crank handle 24, a driving device 34 which is suitable for applying a variable pre-tensioning force to the covering 14 of the device 10 for lying on, and thereby setting different degrees of firmness of the surface for lying on of the device for lying on, which surface is defined by the covering 14. The sides of the covering, which are constructed as pieces of piping and which encompass the frame sections 15, 17, are designed so as to slide on said frame sections 15, 17 in order to adapt to the different forces of the covering.

In the embodiments of a tensioning device 22 which are illustrated in FIGS. 1 and 3, the covering 14 is subjected as a whole, that is to say over its entire area, to a constant pre-tensioning. For this purpose, the tensioning device 22 according to FIG. 3 has two cable pulls 36, 38 which are each coupled to a driving device 34 which, once again, is formed by a gear unit 30 and a crank handle 32. Said cable pulls are connected to the covering 14 at connection points $V_1$ to $V_4$. Deflecting rollers 40 are provided in order to reduce friction. Actuation of the driving device 34 by means of the crank handle 32 results in a pre-tensioning force being applied to the covering 14 locally, that is to say, at the connection points $V_1$ to $V_4$.

Finally, FIG. 4 illustrates an embodiment of a tensioning device 22 which acts upon the frame 12 of the device 10 for lying on, instead of upon the covering 14, in order to vary the pre-tensioning force acting upon said covering 14. The tensioning device 22 according to FIG. 4 comprises a knee lever mechanism 42, a first knee lever 44 being formed by two frame sections 46, 48 which are connected to one another by a first joint 50. Articulated onto the first knee lever 44 in the region of the first joint 50 is a second knee lever 52 which comprises sections 56, 58 which are connected to one another in an articulated manner by a second joint 54. A driving device 34, which, once again, comprises a worm gear and a crank handle (not illustrated), acts upon the second joint 54. Actuation of the driving device 34—see arrow P—results in a relative movement of the sections 56, 58 of the second knee lever 52, which movement is transmitted to the first knee lever 44 via the first joint 50. In particular, actuation of the driving device 44 results in variation of the space between the frame sections 16, 18, which, in turn, results in variation of the pre-tensioning which acts upon the covering 14 stretched over the frame 12.

In the arrangement illustrated in FIG. 4, two tensioning devices 22 are provided, each of which is equipped with a driving device 34 and a knee lever mechanism 42. The pre-tensioning force acting upon various regions of the covering 14 of the device 10 for lying on can be set and varied in a still more selective manner by means of the two driving devices 34.

Figure 5:
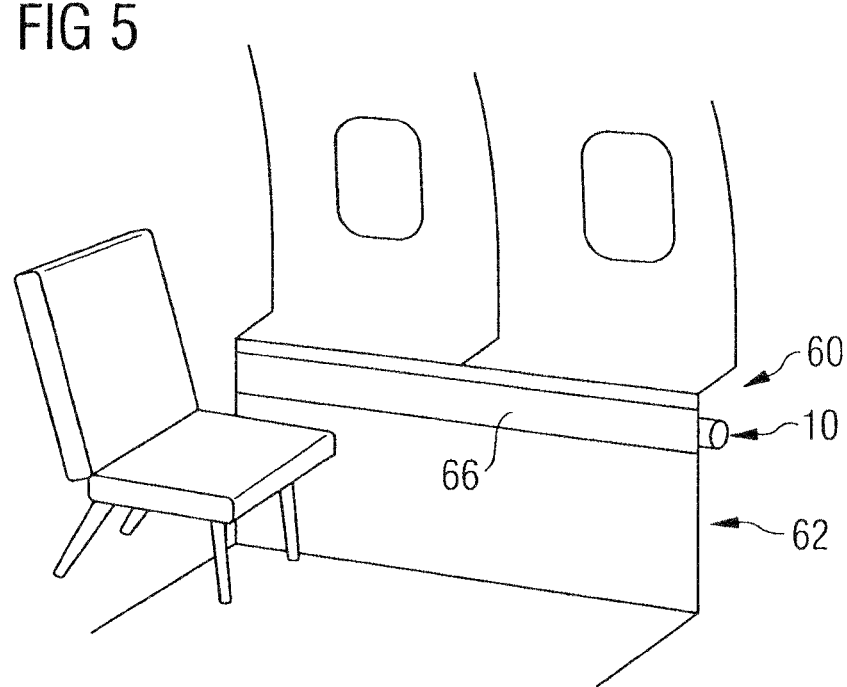
FIG. 5 shows a system for lying on and having a device for lying on which is received in a storage apparatus.
Figure 6:
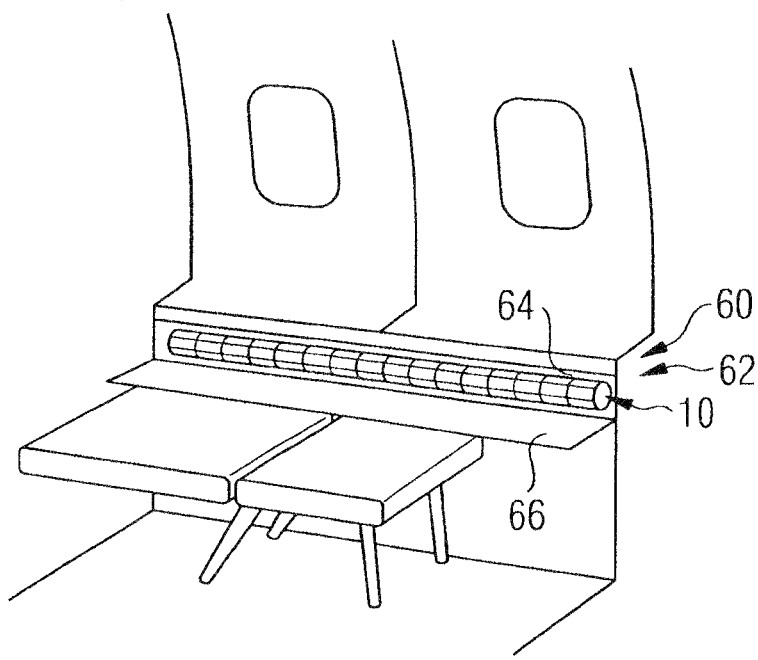
FIG. 6 shows the system for lying on as illustrated in FIG. 5, but wherein a flap that closes a receiving compartment of the storage apparatus is open.

The device 10 for lying on is particularly suitable for use as a couch in a rest room for crew in an aircraft. FIG. 5 shows the device 10 for lying on, in a form integrated into a system 60 for lying on. In addition to the device 10 for lying on, the system 60 comprises a storage apparatus 62 for storing the device for lying on. The storage apparatus 62 comprises a receiving compartment 64 which can be closed by a flap 66. The frame 12 of the device 10 for lying on illustrated in FIGS. 5 to 8 also has frame sections 68, 70 which are designed to be capable of telescoping and which extend along the short sides of the covering 14, which has a rectangular shape.

Figure 7:
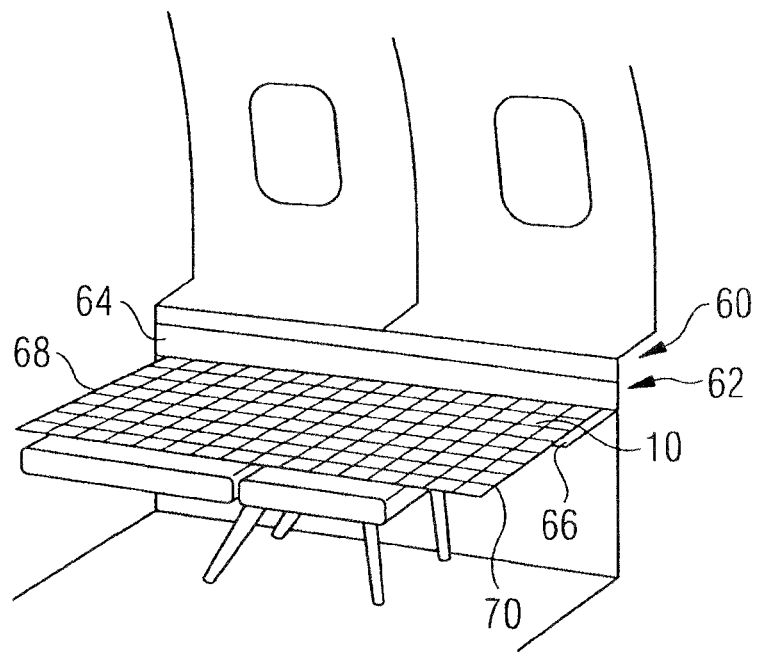
FIG. 7 shows the system for lying on as illustrated in FIG. 5, but wherein the device for lying on has been removed from the storage apparatus.
Figure 8:
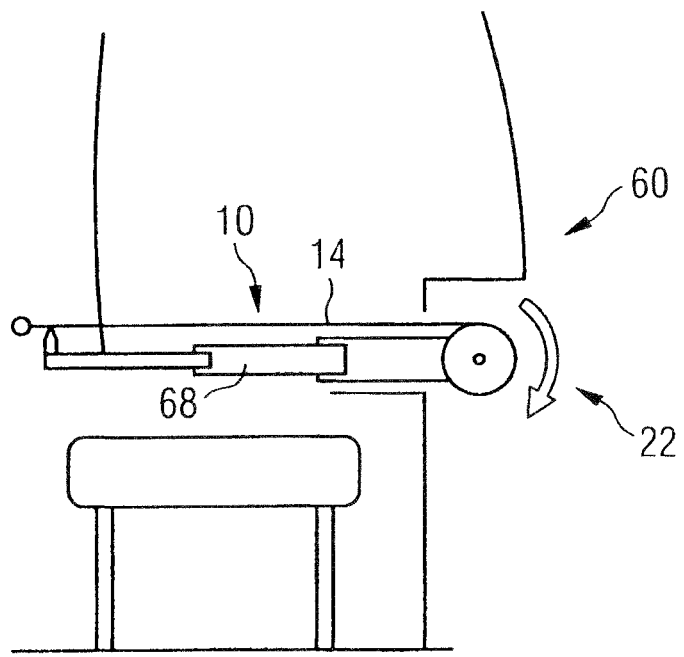
FIG. 8 shows a cross-sectional view of the system for lying on as illustrated in FIG. 7.

It is thereby possible to stow the device 10 for lying on in the receiving compartment 64 of the storage apparatus 62 in a space-saving manner when it is not being used. In order to make the device 10 for lying on usable, it is merely necessary to pull it out of the receiving compartment 64 of the storage apparatus 62 and, in the process, to "pull out" the frame sections 68, 70 which are designed to be capable of telescoping. When the device 10 for lying on has reached its position which is illustrated in FIGS. 7 and 8, it is finally possible, by actuating the tensioning device 22, which may be designed as has been described above, to set the pre-tensioning force acting upon the covering 14, as desired.

In the exemplified embodiments of a device 10 for lying on which are shown here, the covering 14 consists of a knitted fabric which is formed by plastic fibres. A film made of a thermally insulating, vapour-permeable, liquid-tight material, for example Goretex®, is applied to that upper side of the covering 14 which forms the surface for lying on of the device 10 for lying on.

The invention claimed is:

1. A device for lying or sitting on, comprising:
   a frame;
   a covering which is stretched over said frame and defines a surface for lying or sitting on; and
   a tensioner structured to interact with at least one of the frame and/or the covering in order to vary, locally, a pre-tensioning force which acts upon said covering, wherein the tensioner is structured to vary dimensions of the frame in a locally limited manner, to vary, locally, the pre-tensioning force which acts upon the covering.

2. The device for lying or sitting on according to claim 1, characterised in that the tensioner is structured to apply a variable tensile force to the covering in a locally limited manner to vary, locally, the pre-tensioning force which acts upon the covering.

3. The device for lying or sitting on according to claim 1, characterised in that the tensioner comprises a frame section which is connected to the covering and is rotatable about an axis of rotation, and a driver structured to rotate the rotatable frame section about said axis of rotation for the purpose of varying the pre-tensioning force which acts upon the covering.

4. The device for lying or sitting on according to claim 1, characterised in that the tensioner comprises a knee lever mechanism which is formed by sections of the frame, and a driver structured to apply an actuating force to the knee lever mechanism to vary the pre-tensioning force which acts upon the covering.

5. The device for lying or sitting on according to claim 1, characterised in that the tensioner comprises a plurality of drivers.

6. The device for lying or sitting on according to claim 1, characterised in that the covering comprises a knitted or woven fabric.

7. The device for lying or sitting on according to claim 1, characterised in that the covering comprises a film made of a thermally insulating, vapour-permeable and liquid-tight material, or consists of a film made of a thermally insulating, vapour-permeable and liquid-tight material.

8. The device for lying or sitting on according to claim 7, characterised in that the film is applied to an upper side of the covering, which upper side is to be used as the surface for lying or sitting on.

9. A system for lying or sitting on, comprising:
   a device for lying or sitting on according to claim 1, and
   a storage apparatus for storing the device for lying or sitting on when said device for lying or sitting on is not being used.

10. Use in an aircraft of a system for lying or sitting on according to claim 9.

11. Use in an aircraft of a device for lying or sitting on according to claim 1.

* * * * *